United States Patent
Bochum

(10) Patent No.: US 6,508,227 B2
(45) Date of Patent: Jan. 21, 2003

(54) METHOD OF OPERATING AN INTERNAL COMBUSTION ENGINE

(75) Inventor: Hansjoerg Bochum, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 09/727,495

(22) Filed: Dec. 4, 2000

(65) Prior Publication Data

US 2001/0037791 A1 Nov. 8, 2001

(30) Foreign Application Priority Data

Dec. 4, 1999 (DE) .......................... 199 58 465

(51) Int. Cl.⁷ ................................................ F02B 17/00
(52) U.S. Cl. ........................ 123/295; 123/430; 701/104
(58) Field of Search ................... 123/295, 430, 123/305, 435; 701/104

(56) References Cited

U.S. PATENT DOCUMENTS 6,138,638 A * 10/2000 Morikawa ................... 123/295
6,216,664 B1 * 4/2001 Bochum et al. ............. 123/305
6,314,945 B1 * 11/2001 Sugiyama .................... 123/506

FOREIGN PATENT DOCUMENTS

DE    196 45 715    5/1997

* cited by examiner

Primary Examiner—Willis R. Wolfe
Assistant Examiner—Johnny H. Hoang
(74) Attorney, Agent, or Firm—Walter Ottesen

(57) ABSTRACT

The invention is directed to an internal combustion engine (1) especially of a motor vehicle. The engine (1) includes a combustion chamber (4) wherein fuel can be injected during a compression phase in a stratified mode of operation. A control apparatus (18) is provided for determining an injection duration in the stratified operation in dependence upon the pressure difference between a fuel pressure, which operates on the fuel, and a combustion chamber pressure present in the combustion chamber (4). A mean fuel pressure is determined by the control apparatus (18).

12 Claims, 2 Drawing Sheets

METHOD OF OPERATING AN INTERNAL COMBUSTION ENGINE

FIELD OF THE INVENTION

The invention relates to a method for operating an internal combustion engine especially of a motor vehicle wherein fuel is injected into a combustion chamber in a stratified operation during a compression phase and wherein an injection duration is determined in the stratified operation in dependence upon the pressure difference between a combustion chamber pressure, which is present in the combustion chamber, and a fuel pressure operating on the fuel. The invention also relates to a corresponding internal combustion engine as well as a corresponding control apparatus for an internal combustion engine of this kind.

BACKGROUND OF THE INVENTION

A method of the above kind and an internal combustion engine of the above kind as well as a control apparatus of the above type are known from so-called gasoline direct injections, for example, from German patent publication 196 45 715. There, fuel is injected into the combustion chamber of the engine in a homogeneous operation during the induction phase or in a stratified operation during the compression phase. The homogeneous operation is preferably provided for the full-load operation of the engine; whereas, the stratified operation is suitable for idle and part-load operation.

The fuel mass, which is to be injected into the combustion chamber, is computed by the control apparatus in dependence upon the load, which is applied to the engine, and on other operating variables of the engine. This fuel mass, which is to be injected, is converted into a base injection duration, which, under steady-state conditions, would correspond to the fuel mass to be injected. However, one cannot proceed from the steady-state condition because of the changing pressure relationships for an open injection valve. In a further computation step, the base injection duration is therefore converted into a corrected injection duration in dependence upon the pressure difference between the combustion chamber pressure and the fuel pressure. The injection valve of the engine is then driven with this corrected injection duration.

This procedure in the determination of the injection duration requires high complexity of the control apparatus with respect to computation and is furthermore not physically accurate.

SUMMARY OF THE INVENTION

It is an object of the invention to provide a method for operating an internal combustion engine with which an injection duration as accurate as possible can be determined with the least possible complexity with respect to computation.

The method of the invention is for operating an internal combustion engine including an engine of a motor vehicle wherein fuel is supplied to the engine and a combustion chamber pressure (pBr) develops in the combustion chamber of the engine during operation thereof. The method includes the steps of: determining a mean fuel pressure (pm) acting on the fuel supplied to the engine; injecting fuel into the combustion chamber in a stratified mode of operation during a compression phase; and, determining an injection duration (ti) in the stratified mode of operation in dependence upon the pressure difference (deltap) between the fuel pressure (pm) and the combustion chamber pressure (pBr).

With the determination of the mean fuel pressure, it is no longer necessary to correct the computed injection duration in additional computation steps. Monitoring the pressure difference between the fuel pressure and the combustion chamber pressure and the complexity of computation associated therewith are no longer necessary. In total, it is possible with the invention to carry out all computations for the determination of the injection duration on the basis of the mean fuel pressure. This represents a significant simplification of the computations and therefore a significant savings in computation time.

All essential influence quantities can be adequately considered simultaneously in the determination of the mean fuel pressure in accordance with the invention and for the use thereof for the further control (open loop and/or closed loop) of the is engine so that, with the invention, a high accuracy is achieved with the computation of the injection duration.

According to another embodiment of the invention, the mean fuel pressure is measured with the aid of a pressure sensor assigned to a fuel storage. A pressure sensor of this kind is usually already available so that no additional complexity with respect to components is caused hereby.

In another advantageous embodiment of the invention, the fuel pressure, which acts on the fuel, is controlled (open loop and/or closed loop) to the mean fuel pressure. In this way, it is ensured that the mean fuel pressure (which is used in accordance with the invention in the computation of the injection duration) remains essentially constant. In this way, the accuracy of the computation of the injection duration is significantly increased.

It is especially advantageous when the fuel pressure is controlled (open loop and/or closed loop) in such a manner that the mean fuel pressure is available at the center of the injection. In this way, the accuracy of the invention is improved.

In another advantageous embodiment of the invention, the combustion chamber pressure is determined on the basis of a model. This can preferably be carried out on the basis of a polytropic compression. In this context, it can be purposeful when an intake manifold pressure is determined especially with the aid of a pressure sensor mounted in the intake manifold. Alternatively, the intake manifold pressure can also be determined from the operating variables of the engine with the aid of a corresponding model.

In an advantageous embodiment of the invention, the injection duration is determined in dependence upon the mean fuel pressure, the combustion chamber pressure and a fuel mass which is to be injected. The above defines a mode of computation which has a very low complexity with respect to computation and can thereby be carried out especially rapidly by the control apparatus. It is therefore possible in accordance with the invention to convert the fuel mass, which is to be injected, into the corresponding injection duration especially rapidly and nonetheless with great accuracy.

The realization of the method of the invention in the form of a control element is of special significance. This control element is for a control apparatus of an engine, especially of a motor vehicle. A program is stored on the control element which can be run on a computing apparatus (especially on a microprocessor) and is suitable for carrying out the method of the invention. In this case, the invention is realized by a program stored on the control element so that this control element, which is provided with the program, defines the

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
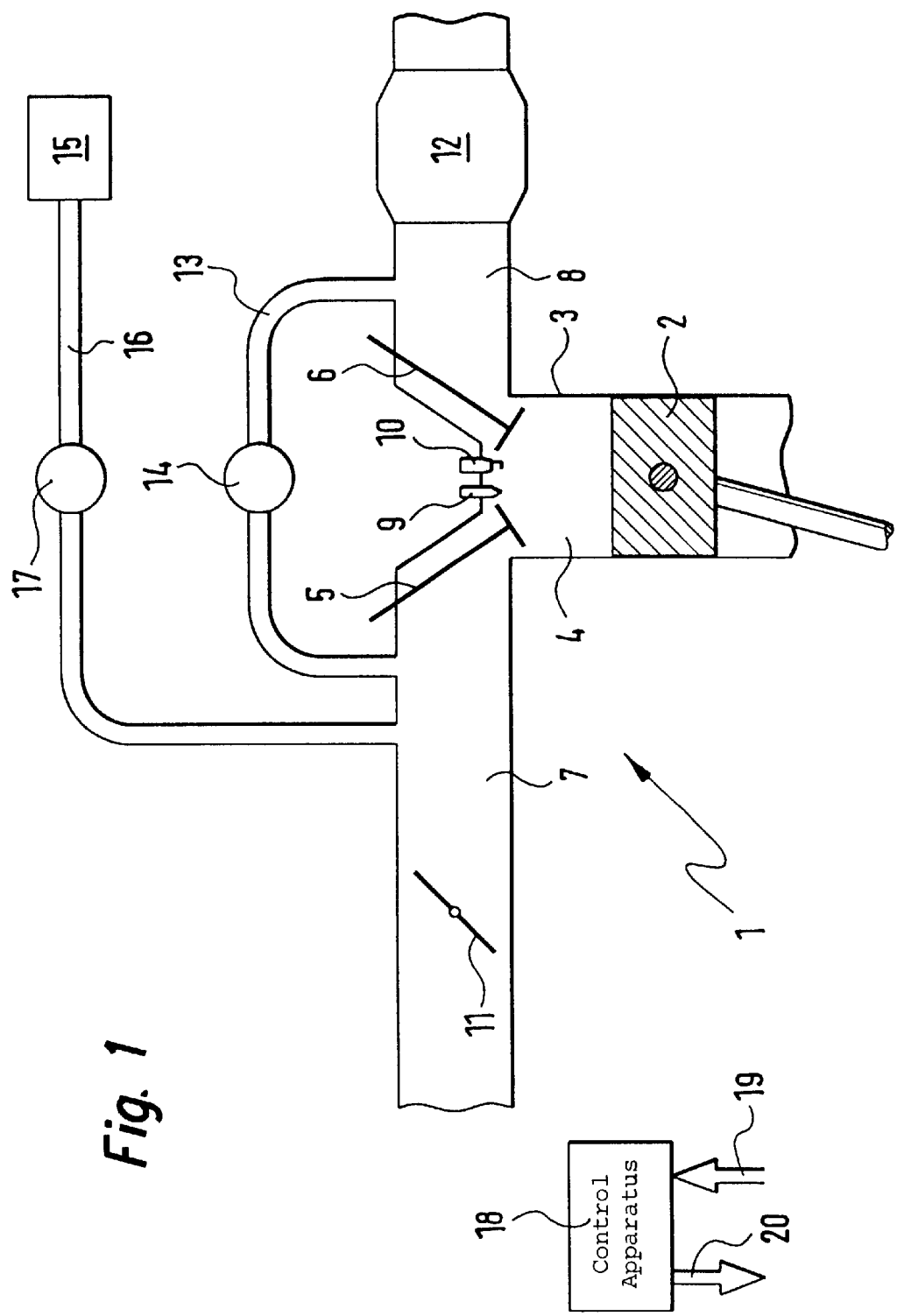
FIG. 1 shows a schematic diagram of an embodiment of an internal combustion engine according to the invention; and, FIG. 2 shows a flowchart of an embodiment of the method of the invention for operating the engine of FIG. 1.

In FIG. 1, an internal combustion engine 1 of a motor vehicle is shown wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6. An injection valve 9 and a spark plug 10 extend into the combustion chamber 4 in the region of the inlet valve 5 and the outlet valve 6. Fuel can be injected into the combustion chamber 4 via the injection valve 9. The fuel in the combustion chamber 4 can be ignited with the spark plug 10.

In the intake manifold 7, a rotatable throttle flap 11 is accommodated via which air can be supplied to the intake manifold 7. The quantity of the supplied air is dependent upon the angular position of the throttle flap 11. A catalytic converter 12 is accommodated in the exhaust-gas pipe 8 and functions to purify the exhaust gas generated by the combustion of the fuel.

An exhaust-gas recirculation pipe 13 leads from the exhaust-gas pipe 8 to the intake manifold 7. An exhaust-gas recirculation valve 14 is accommodated in the exhaust-gas recirculation pipe 13. With the exhaust-gas recirculation valve 14, the quantity of the exhaust gas, which is recirculated into the intake manifold 7, can be adjusted. The exhaust-gas recirculation pipe 13 and the exhaust-gas recirculation valve 14 form a so-called exhaust-gas recirculation which, as such, can be provided but is not mandatory.

A tank-venting line 16 leads from a fuel tank 15 to the intake manifold 7. A tank-venting valve 17 is accommodated in the tank-venting line 16. With the venting valve 17, the quantity of the fuel vapor, which is supplied to the intake manifold 7 from the fuel tank 15, can be adjusted. The tank-venting line 16 and the tank-venting valve 17 define a so-called tank venting which, as such, can be provided but is not mandatory.

A back and forth movement is imparted to the piston 2 by the combustion of the fuel in the combustion chamber 4. This movement is transmitted to a crankshaft (not shown) and a torque is applied to the crankshaft.

Input signals 19 are applied to a control apparatus 18 and these signals define operating variables of the engine 1 measured by means of sensors. For example, the control apparatus 18 is connected to an air-mass sensor, a lambda sensor, an rpm sensor and the like. Furthermore, the control apparatus 18 is connected to an accelerator pedal sensor which generates a signal which indicates the position of an accelerator pedal actuated by the driver and therefore provides the commanded torque. The control apparatus 18 generates output signals 20 with which the performance of the engine 1 can be influenced via actuators and/or positioning devices. For example, the control apparatus 18 is connected to the injection valve 9, the spark plug 10 and the throttle flap 11 and the like and generates the signals required to drive the latter.

The control apparatus 18 is, inter alia, provided for controlling (open loop and/or closed loop) the operating variables of the engine 1. For example, the fuel mass which is injected by the injection valve 9 into the combustion chamber 4 is controlled (open loop and/or closed loop) by the control apparatus 18 especially with respect to a low consumption of fuel and/or a low generation of toxic substances. For this purpose, the control apparatus 18 is provided with a microprocessor which has a program stored in a memory medium (especially in a flash memory) which is suitable to carry out the above-mentioned control (open loop and/or closed loop).

The engine 1 of FIG. 1 can be driven in a plurality of operating modes. Accordingly, it is possible to operate the engine 1 in a homogeneous mode of operation, a stratified mode, a homogeneous lean mode of operation and the like.

In homogeneous operation, the fuel is injected by the injection valve 9 during the induction phase directly into the combustion chamber 4 of the engine 1. The fuel is still substantially swirled in this manner up to ignition so that a substantially homogeneous air/fuel mixture is formed in the combustion chamber 4. The torque, which is to be generated, is then adjusted by the control apparatus 18 essentially via the position of the throttle flap 11. In homogeneous operation, the operating variables of the engine 1 are so controlled (open loop and/or closed loop) that lambda is equal to one. The homogeneous operation is applied especially at full load.

The homogeneous lean operation corresponds substantially to the homogeneous operation; however, the lambda is adjusted to a value of less than one.

In stratified operation, the fuel is injected during the compression phase directly into the combustion chamber 4 of the engine 1 by the injection valve 9. For this reason, no homogeneous mixture is present in the combustion chamber 4 when the mixture is ignited by the spark plug 10. Instead, a fuel stratification is present. The throttle flap 11 can be completely opened except for requirements such as the exhaust-gas recirculation and/or the tank venting and the engine 1 can thereby be operated unthrottled. The torque, which is to be generated, is adjusted substantially via the fuel mass in stratified operation. With the stratified operation, the engine 1 is operated especially in idle and in part load.

A switchover back and forth can take place between the above-mentioned modes of operation of the engine 1. Such switchovers are carried out by the control apparatus 18.

Furthermore, in stratified operation, a fuel mass (m) which is to be injected is determined by the control apparatus 18 in dependence upon the operating variables of the engine 1, for example, in dependence upon a load, which is applied to the engine 1, and/or a driver command or the like. This fuel mass (m) is converted by the control apparatus 18 into an injection duration ti during which the injection valve 9 is controlled in its open condition.

In the open state of the injection valve 9, the following throughflow of fuel through the opening of the injection valve results in approximation:

$$mpunkt = A \cdot (2 \cdot roh \cdot deltap/teta)^{1/2}$$

wherein:

mpunkt is the mass flow through the injection valve 9;

A is the cross section of the opening of the injection valve 9;

roh is the density of the fuel;

deltap is the pressure difference; and, teta is the throughflow coefficient.

The pressure difference deltap results from the fuel pressure, which operates on the fuel, and the combustion chamber pressure which is present in the combustion chamber 4. The fuel pressure is generated by a mechanical and/or an electrical fuel pump; whereas, the combustion chamber pressure develops because of the movement of the piston 2 in the cylinder 3.

From the above equation, the following results from integration:

$$m=\int (A(t)\cdot (2\cdot roh(t)\cdot deltap(t)/teta(t))^{1/2} dt$$

wherein:

m is the fuel mass;

ti is the injection duration; and, t is the time.

In the above equation, the integral is to be integrated over the injection duration ti. Furthermore, all parameters below the integral are dependent upon time. The above results from the situation that during the injection duration ti (during which the injection valve 9 is open), the fuel pressure, which acts on the fuel, becomes less so that the pressure difference deltap changes as a function of time (t). Likewise, the density roh of the fuel changes with time (t) because of the falling fuel pressure. Furthermore, the combustion chamber pressure changes because of the movement of the piston 2 in the cylinder 3 so that, to this extent, a change of the pressure difference deltap also takes place as a function of time (t). Because of the changed pressure difference deltap, the throughflow coefficient teta also changes as a function of time (t).

A characteristic time point tc is selected by the control apparatus 18 from which the further computations can proceed. At this time point tc, the following results:

$$m=A(tc)/(teta(tc))^{1/2} \cdot (2 \cdot roh(tc) \cdot deltap(tc))^{1/2} \cdot ti.$$

The center of the injection is selected as a characteristic time point tc. Accordingly, the time point of the center of the injection is computed by the control apparatus 18 as the injection time point and processed further. In this way, the above equation becomes simplified as follows:

$$m=A/(teta)^{1/2} \cdot (2 \cdot rohm \cdot (pm-pBr))^{1/2} ti$$

wherein:

$A/(teta)^{1/2}$ is the constant of the injection valve 9;

rohm is the mean density of the fuel;

pm is the mean fuel pressure; and, pBr is the combustion chamber pressure at the center of the injection.

The above-mentioned constant of the injection valve 9 can be determined once and can be stored in the control apparatus 18. The fuel pressure, which operates on the fuel, is controlled (open loop and/or closed loop) in such a manner by the control apparatus 18 that the mean fuel pressure pm is present at the center of the injection. In this way, the fuel pressure at the center of the injection is controlled (open loop and/or closed loop) to a constant value, namely, to the mean fuel pressure pm. With this mean fuel pressure pm, the mean density rohm of the fuel is computed by the control apparatus 18.

The combustion chamber pressure is determined by the control apparatus 18 on the basis of the constant mean fuel pressure at the center of the injection. This can be carried out with the aid of a model, for example, by means of a method on the basis of a polytropic compression. The starting pressure for this compression corresponds to the known intake manifold pressure in the intake pipe 7.

Because of the selected center of the injection as a characteristic time point tc, the movement of the injection valve 9 and therefore the injection per se is sufficiently far away from transient conditions at the start and at the end of the injection. For this reason, one can assume that steady-state conditions are present.

As mentioned, the time point of the center of the injection is computed as the injection time point by the control apparatus 18. This can, for example, take place on the basis of a determined injection start time point. For this purpose, a preliminary injection time ti can first be estimated on the basis of empirical values or the like to compute the center of the injection in dependence upon the rpm of the engine 1 by means of an approximation. Alternatively, one can compute with a substitute value for the center of the injection. The injection time point from one injection to the next injection changes only very slowly. For this reason, this substitute value can be based on the directly preceding injection center.

From the last mentioned equation, the injection duration ti can be determined by the control apparatus 18 via conversion from the fuel mass (m) which is to be injected, the mean fuel pressure pm which operates on the fuel, and from the intake manifold pressure. This will be shown below with respect to FIG. 2.

Figure 2:
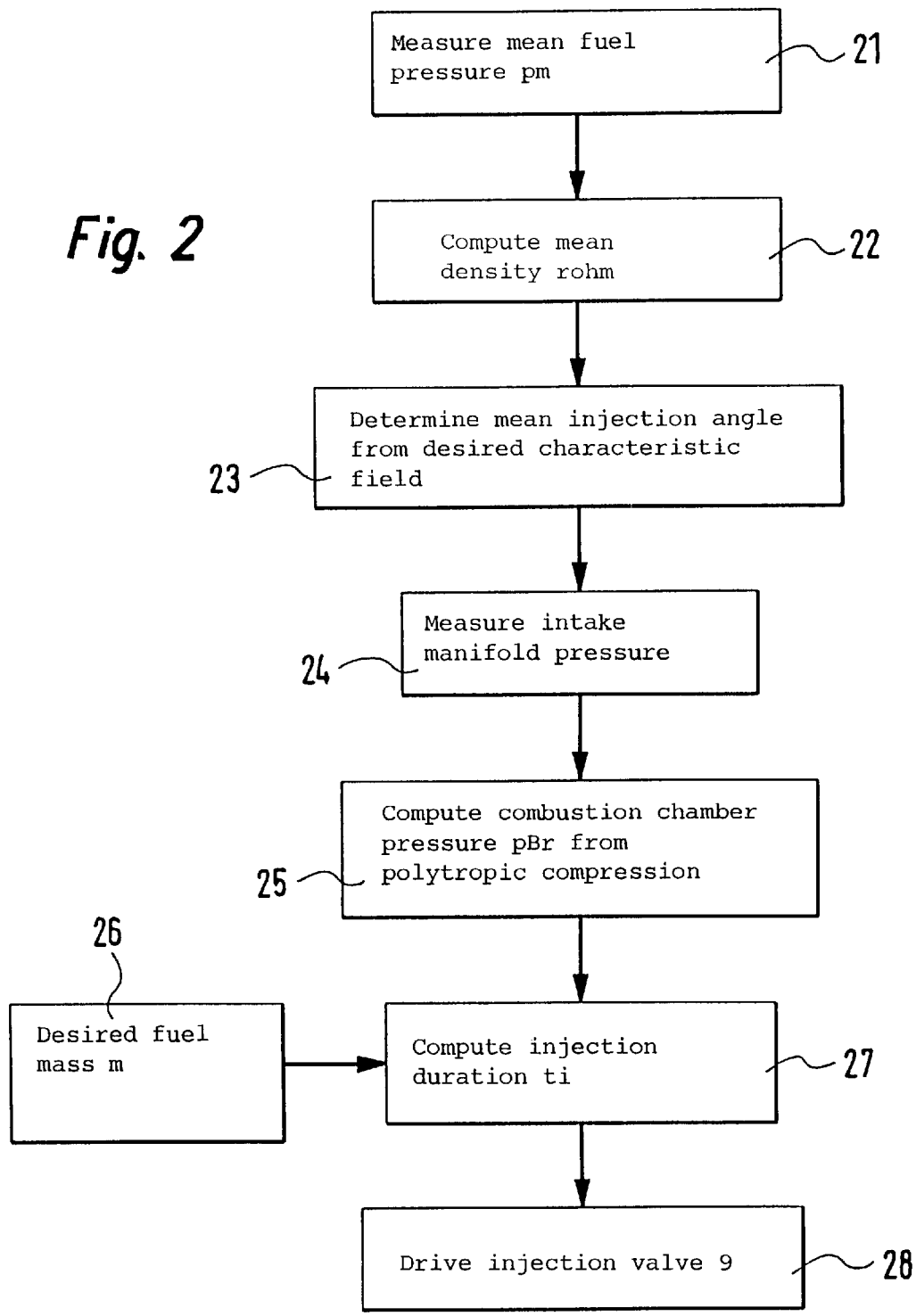

In FIG. 2, the mean fuel pressure pm is measured in block 21. This can be carried out, for example, with the aid of a pressure sensor which is mounted in the fuel preparation system. The pressure sensor can be especially assigned to a fuel storage which is arranged ahead of the injection valve 9 and into which the fuel is pumped from a fuel tank by an electric and/or mechanical pump. The pressure in this fuel storage is controlled (open loop and/or closed loop) by the control apparatus 18 via a corresponding drive of the electric and/or mechanical pump and/or additional valves to the above-mentioned mean fuel pressure.

In block 22, the mean density rohm of the fuel is computed by the control apparatus 18 from the mean fuel pressure pm.

Thereafter, the time point of the center of the injection is computed in block 23 by the control apparatus 18. This is carried out in correspondence to one of the alternatives already explained. This time point of the center of the injection is converted into a mean injection angle in dependence upon the rpm of the engine 1 via a desired characteristic field.

In block 24, the intake manifold pressure in the intake pipe 7 is measured with the aid of a pressure sensor. This intake manifold pressure is used in block 25 by the control apparatus 18 to compute the combustion chamber pressure pBr on the basis of the polytropic compression.

As already mentioned, the constant $A/(teta)^{1/2}$ is known and is stored in the control apparatus 18. Furthermore, the fuel mass (m) is determined in block 26 by the control apparatus 18 especially as a desired fuel mass from operating variables of the engine 1.

In this way, in block 27, the control apparatus 18 can compute the injection time ti in accordance with the last-explained equation from the above-mentioned variables. In block 28, the injection valve 9 is driven with this injection duration ti. The entire method of FIG. 2 is provided for the stratified operation wherein the injection of the fuel takes place during the compression phase.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine having a combustion chamber including an engine of a motor vehicle wherein fuel is supplied to the engine and a combustion chamber pressure (pBr) develops in the combustion chamber of the engine during operation thereof, the method comprising the steps of:

measuring a mean fuel pressure (pm) acting on said fuel supplied to said engine utilizing a sensor assigned to a fuel store;

controlling the fuel pressure acting on said fuel to said mean fuel pressure (pm);

injecting fuel into said combustion chamber in a stratified mode of operation during a compression phase; and, determining an injection duration (ti) in said stratified mode of operation in dependence upon a pressure difference (deltap) between said mean fuel pressure (pm) and said combustion chamber pressure (pBr).

2. The method of claim 1, wherein the injected fuel defines a center; and, wherein the method comprises the further step of controlling said fuel pressure so as to cause said mean fuel pressure (pm) to be present at the center of said injection.

3. The method of claim 1, comprising the further step of determining said combustion chamber pressure (pBr) based on a model.

4. The method of claim 3, comprising the further step of determining said combustion chamber pressure (pBr) on the basis of a polytropic compression.

5. The method of claim 3, comprising the further step of determining an intake manifold pressure to determine said combustion chamber pressure (pBr).

6. The method of claim 5, comprising the further step of determining said intake manifold pressure with the aid of a pressure sensor assigned to said intake manifold.

7. The method of claim 1, comprising the further step of determining said injection duration (ti) in dependence upon: said mean fuel pressure (pm), said combustion chamber pressure (pBr) and a fuel mass (m) to be injected.

8. A control element for a control apparatus of an internal combustion engine to which fuel is supplied including an engine of a motor vehicle, the control element comprising a program stored thereon which can be run on a computing apparatus and said program being adapted to carry out a method including the steps of:

measuring a mean fuel pressure (pm) acting on the fuel supplied to said engine utilizing a sensor assigned to a fuel store;

controlling the fuel pressure acting on said fuel to said mean fuel pressure (pm);

injecting fuel into a combustion chamber of said engine in a stratified mode of operation during a compression phase; and, determining an injection duration (ti) in said stratified mode of operation in dependence upon a pressure difference (deltap) between said mean fuel pressure (pm) and said combustion chamber pressure (pBr).

9. The control element of claim 8, wherein said control apparatus is a microcomputer.

10. The control element of claim 8, wherein said control element is a read-only-memory or a flash memory.

11. An internal combustion engine including an engine of a motor vehicle, the engine having a combustion chamber into which fuel can be injected during a compression phase in a stratified mode of operation, the engine comprising:

a control apparatus including a sensor assigned to a fuel store for measuring a mean fuel pressure (pm);

said control apparatus further including means for controlling the fuel pressure acting on said fuel to said mean fuel pressure (pm); and, said control apparatus further including means for determining an injection duration (ti) in said stratified mode of operation in dependence upon a pressure difference (deltap) between said mean fuel pressure (pm) and said combustion chamber pressure (pBr).

12. A control apparatus for an internal combustion engine including an engine of a motor vehicle, the engine having a combustion chamber into which fuel can be injected during a compression phase in a stratified mode of operation of said engine, said control apparatus comprising:

a sensor assigned to a fuel store for measuring a mean fuel pressure (pm) acting on said fuel supplied to said engine;

means for controlling the fuel pressure acting on said fuel to said mean fuel pressure (pm); and, means for determining an injection duration (ti) in said stratified mode of operation in dependence upon a pressure difference (deltap) between said mean fuel pressure (pm) and said combustion chamber pressure (pBr).

\* \* \* \* \*